July 5, 1932.  W. W. RIEDEL  1,865,482
HYDRAULIC SHOCK ABSORBER
Filed July 31, 1929  2 Sheets-Sheet 1

Inventor
Walter W. Riedel
By Spencer, Hardman and Fehr
His Attorneys

July 5, 1932.   W. W. RIEDEL   1,865,482
HYDRAULIC SHOCK ABSORBER
Filed July 31, 1929   2 Sheets-Sheet 2

Inventor
Walter W. Riedel
By Spencer, Hardman and Fehr
Attorney

Patented July 5, 1932

1,865,482

UNITED STATES PATENT OFFICE

WALTER W. RIEDEL, OF DAYTON, OHIO, ASSIGNOR TO DELCO PRODUCTS CORPORATION, OF DAYTON, OHIO, A CORPORATION OF DELAWARE

HYDRAULIC SHOCK ABSORBER

Application filed July 31, 1929. Serial No. 382,476.

This invention relates to improvements in hydraulic shock absorbers particularly adapted to control the movements of vehicle springs.

It is among the objects of the present invention to provide a shock absorber adapted to control both the compression and rebound movements of vehicle springs.

Further objects and advantages of the present invention will be apparent from the following description, reference being had to the accompanying drawings wherein a preferred embodiment of one form of the present invention is clearly shown.

Figure 1:
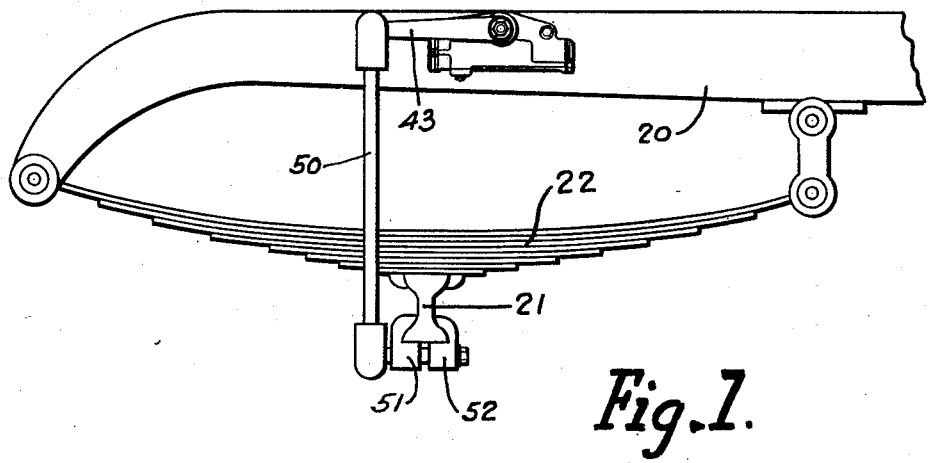
Fig. 1 is a side view of a portion of a vehicle chassis having a shock absorber secured thereto which is equipped with the present invention.
Figure 2:
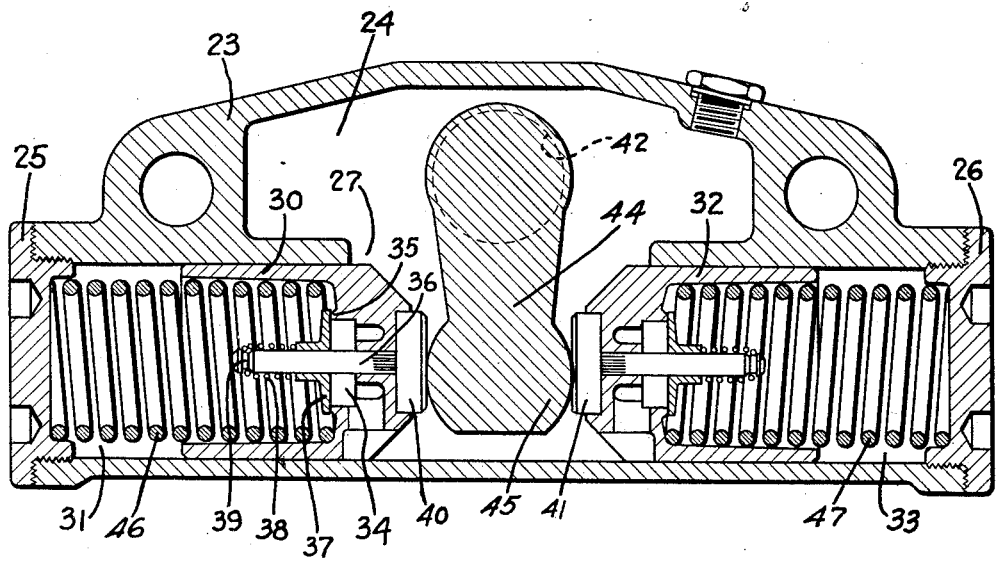
Fig. 2 is a longitudinal sectional view taken through the center of the cylinders of the shock absorber.
Figure 3:
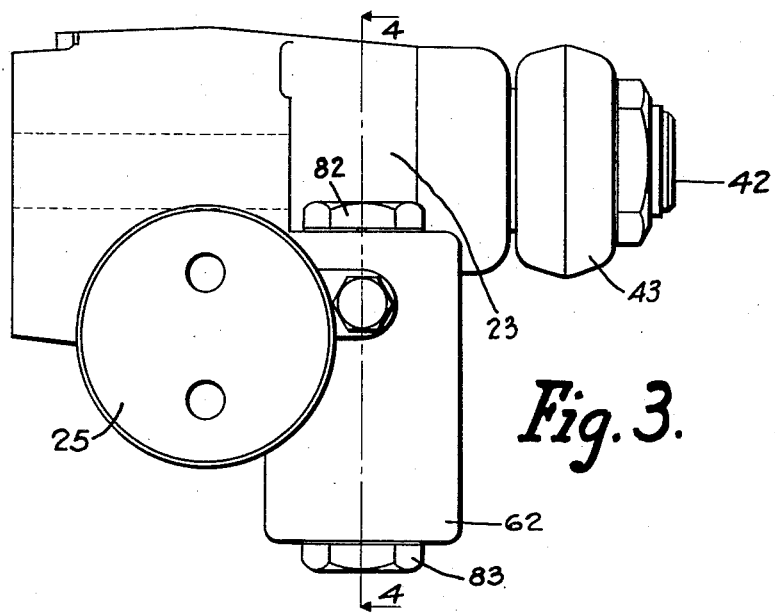
Fig. 3 is an end view of the shock absorber.

Referring to the drawings, the numeral 20 designates the frame of the vehicle supported on the vehicle axle 21 by vehicle springs 22, only one of which is shown.

The shock absorber comprises a casing 23 presenting a fluid reservoir 24 and a cylindrical portion closed at opposite ends by screw caps 25 and 26. The intermediate part of the cylindrical portion is in communication with the fluid reservoir 24 through the opening 27.

In the end of the cylindrical portion closed by the cover cap 25 there is provided a piston 30 forming a compression chamber 31 in the casing. In the cylindrical portion closed by the cover cap 26, a piston 32 is provided, forming compression chamber 33 in the casing. Inasmuch as both pistons are exactly alike, only one of them will be described detailedly.

Referring to the piston 30, the head of the piston has a passage 34 therethrough providing for the transfer of fluid from one side of the piston to the other. An annular ridge 35 is provided on the inner surface of the piston head about the passage 34, said annular ridge providing a valve seat. A valve pin 36 supported in the piston head and extends through the passage 34 coaxially into the interior of the pistons. Upon this valve pin a valve 37 is slidably supported, said valve being yieldably urged into engagement with the valve seat 35 by a spring 38, one end of which engages the valve 37, the other end of which snaps into locking engagement with a groove 39 provided adjacent the free end of valve pin 37. The valve structure just described provides for a substantially free flow of fluid from the reservoir 24 into the compression chamber 31 and is particularly adapted to replenish any fluid losses in said reservoir due to leakage. A wear-piece 40 is provided in the head of the piston. The piston 32 has a similar valve structure, a wear-piece 41 being provided in its head.

The shock absorber casing supports a rocker shaft 42, one end of which extends outside the casing and has the shock absorber operating lever 43 provided thereon. Within the fluid reservoir 24 the rocker shaft 42 is provided with a rocker lever 44, said lever having a ball end 45 which is interposed between the wear-pieces 40 and 41 of the pistons 30 and 32. Coil spring 46 interposed between the piston 30 and the cover cap 25 normally urges said piston toward the lever 44 so that the wear-piece 40 is maintained in engagement with the ball end 45 of the lever 44. Likewise a spring 47 interposed between piston 32 and the cover cap 26 urges the piston 32 so that its wear-piece 41 engages the ball end 45 of the lever 44.

The free end of the shock absorber operating arm 43 is swivelly attached to a connecting link 50, the other end of said link being secured to the axle 21 by a bracket 51 and a clamping member 52, the bracket having the end of the link 50 swivelly attached thereto.

From the aforegoing it may be seen that when the spring 22 is compressed and flexed toward the frame 20, the link connection 50 will move the shock absorber operating arm 43 clockwise, resulting in a clockwise rotation of the rocker shaft 42 and its lever 44, thereby causing said lever 44 to move the piston 30 toward the end of its cylinder portion and permitting spring 47 to move piston 32 away from the end of its cylinder portion. The reverse action obtains when the spring 22 returns to its normal position.

Figure 4:
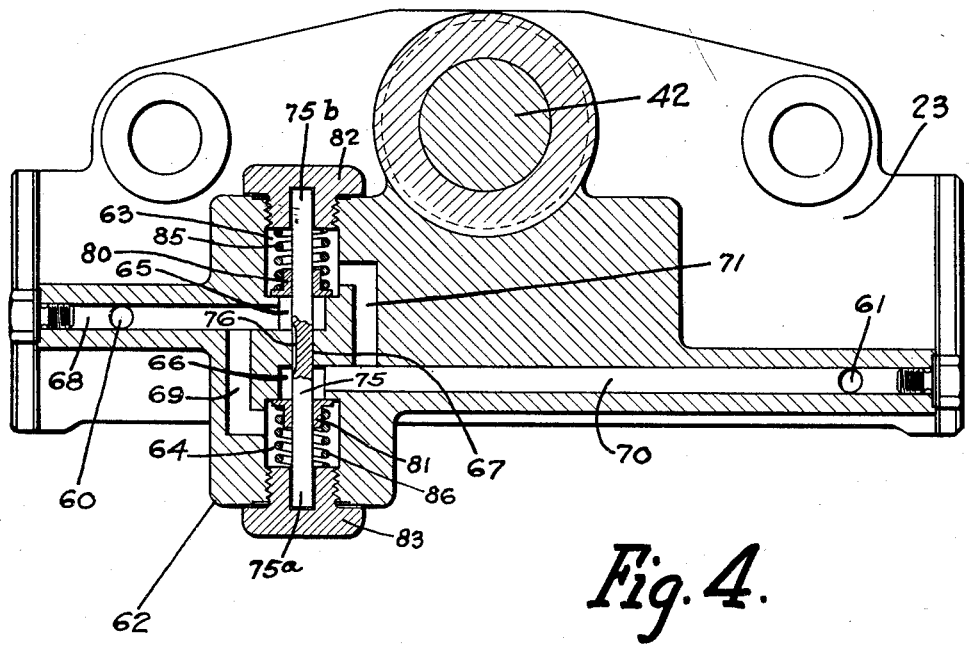
Fig. 4 is a sectional view taken longitudinally along the line 4—4 of Fig. 3.

The pressure relief mechanism of the shock absorber provides for restricted flows of fluid between the compression chambers for resisting movement of the pistons and consequently resisting movement of the vehicle springs. A passage 60 leads from the compression chamber 31, which may be termed the spring compression control chamber. A similar passage 61 leads from what may be termed the spring rebound control chamber 33. A lug portion 62 formed on the casing has two recesses oppositely disposed. Recess 63 is provided in one side of the lug portion 62, and recess 64 is provided in the opposite side of the lug portion 62, both of said recesses being substantially in coaxial alignment, as shown in Fig. 4. These recesses are termed valve chambers. Each valve chamber 63 and 64 has a counterbore 65 and 66 respectively. A channel 67 connects the counterbores, the channel being substantially coaxial of both valve chambers. A duct 68 is provided in the casing, forming communication between the passage 60 leading from the spring compression control chambers 31, and the counterbore 65 leading to the valve chamber 63. Another duct 69 provides communication between the duct 68 and the valve chamber 64. A duct 70 is connected at one end with the counterbore 66 of the valve chamber 64, the other end of said duct communicating with the passage 61. A duct 71 provides communication between duct 70 and the valve chamber 63.

The counterbores provided in their respective valve chambers provide a shoulder in each valve chamber which forms a valve seat. As shown in Fig. 4, a pin 75 fits snugly into the channel 67, one end 75a of the pin extending coaxially into the valve chamber 64, the other end 75b of the pin extending coaxially into the valve chamber 63. The intermediate portion of the pin fits snugly into the chamber 67 and has a groove 76 which provides a restricted, constant communication between the two counterbores 65 and 66 of the respective valve chambers 63 and 64. A valve 80 is slidably supported upon the pin portion 75b, while the pin portion 75a slidably supports the valve 81. A screw plug 82 fits into the outer end of the valve chamber 63 and is recessed so as to receive the end portion 75b of the pin whereby this end of the pin is properly located and supported. A similar screw plug 83 fits into the outer end of valve chamber 64 and receives the end 75a of valve pin. The valve 80 is yieldably urged into engagement with its valve seat by a spring 85 interposed between the screw plug 82 and the valve, a similar spring 86 interposed between the valve 81 and screw plug 83 yieldably urging valve 81 into engagement with its valve seat. The valve 80 normally shuts off communication between the ducts 68 and 71, while the valve 81 normally shuts off communication between the ducts 70 and 69.

In operation, when the spring 22 is being flexed into compressed position and, as has been mentioned heretofore, while the piston 30 is consequently being moved toward the end of its cylinder, pressure will be exerted upon the fluid in compression chamber 31, which pressure is exerted through the passage 60 into the duct 68 and then to counterbore 65 against the valve 80. When this pressure reaches a predetermined value, it will move the valve 80 against the effect of its spring 85, thus will be established communication between ducts 68 and 71 and consequently a fluid flow will be established from the compression chamber 31, passage 60, duct 68, counterbore 65, past the valve 80 into the valve chamber 63 thence through ducts 71 and 70, through passage 61 into the spring rebound control chamber 33. The flow of fluid past the valve 80 will of course be restricted, thus the movement of the piston 30 toward the end of its cylinder portion will be resisted, and consequently the compression movement of spring 22 will likewise be resisted.

Upon the return movement of the spring 22, a reverse motion of the shock absorber obtains. The rocker lever 44 will now be moved in a counterclockwise direction, resulting in a movement of the piston 32 toward the end of its cylinder portion. Pressure exerted upon the fluid within the spring rebound control chamber 33 will, when such pressure has attained a predetermined value, move the valve 81 from its seat against the effect of spring 86, and thus the flow from the spring rebound control chamber will be established: through passage 61, duct 70, counterbore 66, past the valve 81 into the valve chamber 64, thence through ducts 69 and 68, passage 60 into the spring compression control chamber 31. The flow of fluid past valve 81 will be restricted, thus the movement of the piston 32, as well as the return movement of spring 22, will be resisted.

From the aforegoing it may be seen that the valves 80 and 81 move from their seats to establish pressure relieving flows from the respective chambers 31 and 33 caused by more extensive movements of the springs 22.

Slight pressures, resulting from slight movements of the springs 22 are relieved by the fluid flow established through the constantly open passage 76 in the pin 75. When the pressure cannot be relieved by this flow then the valves 80 and 81 will be moved to establish additional pressure relieving flows.

The present device provides a shock absorber of simplified structure and design, the pressure relief mechanism in particular being of a simple nature, easily assembled and easily available for purposes of modifying the action of the shock absorber when desired.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing providing a fluid reservoir and a cylinder; pistons in the cylinder forming two compression chambers therein; ducts in the casing providing communication between the said chambers; a check-valve adapted, in response to a predetermined fluid pressure, to establish a flow of fluid through said ducts in one direction only; another check-valve adapted to establish a flow of fluid through said ducts in the other direction only, in response to another predetermined fluid pressure; and a common member secured to the casing and supporting both check valves, said member having means for establishing a restricted flow of fluid between the compression chambers independently of the check valves.

2. A shock absorber comprising in combination, a casing providing a fluid reservoir and a cylinder; pistons in the cylinder forming two compression chambers therein; ducts in the casing providing communication between the said chambers; a check-valve adapted, in response to a predetermined fluid pressure, to establish a flow of fluid through said ducts in one direction only; another check-valve adapted to establish a flow of fluid through said ducts in the other direction only, in response to another predetermined fluid pressure; and a fluid metering pin supported intermediate its ends by the casing, said pin slidably carrying both check valves.

3. A shock absorber comprising in combination, a casing providing a fluid reservoir and a cylinder; pistons in the cylinder forming two compression chambers therein; ducts in the casing providing communication between the said chambers; a check-valve adapted, in response to a predetermined fluid pressure, to establish a flow of fluid through said ducts in one direction only; another check-valve adapted to establish a flow of fluid through said ducts in the other direction only, in response to a predetermined fluid pressure; and a pin slidably supporting both check valves, said pin having provisions for establishing a constantly restricted flow of fluid through said ducts in either direction in response to fluid pressure in the respective compression chambers.

4. A shock absorber comprising in combination, a casing providing a fluid reservoir and a cylinder; pistons in the cylinder forming two compression chambers therein; ducts in the casing providing communication between the said chambers; a check-valve adapted, in response to a predetermined fluid pressure, to establish a flow of fluid through said ducts in one direction only; another check-valve adapted to establish a flow of fluid through said ducts in the other direction only, in response to a predetermined fluid pressure; and a pin supported intermediate its ends by the casing, said intermediate portion of the pin having a groove providing a constantly open fluid passage between the ducts, said pin slidably supporting a check valve on each side of the intermediate portion supported in the casing.

5. A shock absorber comprising in combination, a casing providing a fluid reservoir and a cylinder; pistons in the cylinder forming two compression chambers therein; coaxially aligned recesses in opposite sides of a casing portion; a counterbore in each of said recesses; a channel connecting said counterbores; communicating ducts connecting the one compression chamber with one counterbore and the other recess; communicating ducts connecting the counterbore of the last mentioned recess and the other recess with the other compression chamber; a pin fitting snugly into the channel connecting the counterbores and extending into each recess; and a spring pressed valve slidably supported by the pin in each recess, said valves normally shutting off communication between the ducts connected to the respective recesses and their counterbores.

6. A shock absorber comprising in combination, a casing providing a fluid reservoir and a cylinder; pistons in the cylinder forming two compression chambers therein; coaxially aligned recesses in opposite sides of a casing portion; a counterbore in each of said recesses; a channel connecting said counterbores; communicating ducts connecting the one compression chamber with one counterbore and the other recess; communicating ducts connecting the counterbore of the last mentioned recess and the other recess with the other compression chamber; a pin fitting snugly into the channel connecting the counterbores and extending ito each recess; said pin having a groove providing a constant communication between the two counterbores; and a spring loaded valve slidably supported by the pin portion in each recess, said valves being urged normally to close communication between the ducts leading to the respective sides of said valves.

7. A shock absorber comprising in combination, a casing providing a fluid reservoir and a cylinder; pistons in the cylinder forming two compression chambers therein; coaxially aligned recesses in the opposite sides of a casing portion, forming two valve chambers in said casing; a counterbore in each recess; a channel connecting the counterbores; separate ducts in the casing connecting the respective counterbores with a compression chamber; ducts connecting the respective valve chambers with the duct leading to the counterbore of the opposite valve chamber; a pin fitting snugly into the channel connecting the counterbores and extending into each valve chamber, said pin having a groove providing a constant, restricted communication between said counterbores; a plug for closing the open end of each valve chamber, each plug being recessed to receive an end of the pin to support and properly locate the respective pin ends; a valve slidably supported by the pin in each valve chamber; and a spring interposed between each valve and the valve chamber plug, said spring yieldably urging the respective valves normally to shut off communication between the ducts connecting with the respective valve chambers and their counterbores.

In testimony whereof I hereunto affix my signature.

WALTER W. RIEDEL.